(12) United States Patent
Levi et al.

(10) Patent No.: US 11,651,066 B2
(45) Date of Patent: May 16, 2023

(54) SECURE TOKEN-BASED COMMUNICATIONS BETWEEN A HOST DEVICE AND A STORAGE SYSTEM

(71) Applicant: EMC IP Holding Company LLC, Hopkinton, MA (US)

(72) Inventors: Efi Levi, Beer Sheva (IL); Boris Giterman, Beer Sheva (IL); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 137 days.

(21) Appl. No.: 17/143,560

(22) Filed: Jan. 7, 2021

(65) Prior Publication Data

US 2022/0215084 A1    Jul. 7, 2022

(51) Int. Cl.
*G06F 21/45* (2013.01)
*G06F 1/12* (2006.01)
(Continued)

(52) U.S. Cl.
CPC ............... *G06F 21/45* (2013.01); *G06F 1/12* (2013.01); *H04L 63/0846* (2013.01); *H04L 67/10* (2013.01)

(58) Field of Classification Search
CPC ....... G06F 21/45; G06F 1/12; H04L 63/0846; H04L 67/10
See application file for complete search history.

(56) References Cited

U.S. PATENT DOCUMENTS

| 4,720,860 A | 1/1988 | Weiss |
|---|---|---|
| 5,168,520 A | 12/1992 | Weiss |

(Continued)

FOREIGN PATENT DOCUMENTS

| CN | 103677927 B | 2/2017 |
|---|---|---|
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Cheikh T Ndiaye
(74) *Attorney, Agent, or Firm* — Ryan, Mason & Lewis, LLP

(57) ABSTRACT

An apparatus comprises at least one processing device that is configured to control delivery of input-output operations from a host device to a storage system over selected ones of a plurality of paths through a network. The at least one processing device is further configured to generate a plurality of authentication tokens over time utilizing seed information of the host device, and for each of one or more of the input-output operations, to incorporate a particular one of the authentication tokens into the input-output operation, to send the input-output operation to the storage system, and to receive an indication from the storage system, responsive to the input-output operation sent to the storage system, as to whether or not the authentication token incorporated into the input-output operation matches a corresponding authentication token generated by the storage system. The at least one processing device illustratively comprises at least a portion of the host device.

20 Claims, 4 Drawing Sheets

(51) Int. Cl.
*H04L 9/40* (2022.01)
*H04L 67/10* (2022.01)

(56) References Cited

U.S. PATENT DOCUMENTS

| | | | |
|---|---|---|---|
| 5,361,062 A | 11/1994 | Weiss et al. | |
| 5,428,349 A | 6/1995 | Baker | |
| 5,870,471 A | 2/1999 | Wootton et al. | |
| 6,567,397 B1 | 5/2003 | Campana et al. | |
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,392,291 B2* | 6/2008 | Jewett | H04L 63/08 709/215 |
| 7,409,705 B1 | 8/2008 | Ueda et al. | |
| 7,454,437 B1 | 11/2008 | Lavallee et al. | |
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,224,887 B2 | 7/2012 | Singerle, Jr. | |
| 8,245,292 B2 | 8/2012 | Buer | |
| 8,250,256 B2 | 8/2012 | Ghosalkar et al. | |
| 8,285,825 B1 | 10/2012 | Nagaraj et al. | |
| 8,412,928 B1 | 4/2013 | Bowness | |
| 8,504,842 B1 | 8/2013 | Meacham | |
| 8,572,713 B2 | 10/2013 | Buer | |
| 8,752,146 B1 | 6/2014 | van Dijk et al. | |
| 8,752,153 B2 | 6/2014 | Vysogorets et al. | |
| 8,825,919 B1 | 9/2014 | Lim et al. | |
| 8,832,334 B2 | 9/2014 | Okita | |
| 8,874,746 B1 | 10/2014 | Gonzalez | |
| 8,959,195 B1 | 2/2015 | Niranjan et al. | |
| 8,966,276 B2 | 2/2015 | Nanopoulos et al. | |
| 9,026,694 B1 | 5/2015 | Davidson et al. | |
| 9,071,424 B1 | 6/2015 | Bowness et al. | |
| 9,106,405 B1* | 8/2015 | Roth | H04L 63/068 |
| 9,147,063 B1 | 9/2015 | Florissi et al. | |
| 9,191,386 B1 | 11/2015 | Yaron et al. | |
| 9,201,803 B1 | 12/2015 | Derbeko et al. | |
| 9,225,700 B1 | 12/2015 | Dotan et al. | |
| 9,225,717 B1 | 12/2015 | Brainard et al. | |
| 9,400,611 B1 | 7/2016 | Raizen | |
| 9,411,948 B1 | 8/2016 | Suresh et al. | |
| 9,430,368 B1 | 8/2016 | Derbeko et al. | |
| 9,432,339 B1 | 8/2016 | Bowness | |
| 9,594,780 B1 | 3/2017 | Esposito et al. | |
| 9,647,933 B1 | 5/2017 | Tawri et al. | |
| 9,660,987 B2* | 5/2017 | Bagal | G06F 13/102 |
| 9,672,160 B1 | 6/2017 | Derbeko et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,764,371 B2 | 9/2020 | Rao et al. | |
| 10,789,006 B1 | 9/2020 | Gokam et al. | |
| 10,817,181 B2 | 10/2020 | Mallick et al. | |
| 10,838,648 B2 | 11/2020 | Sharma et al. | |
| 10,880,217 B2 | 12/2020 | Mallick et al. | |
| 10,884,935 B1 | 1/2021 | Doddaiah | |
| 10,936,191 B1* | 3/2021 | Lakshminarayanan | G06F 3/067 |
| 2002/0023151 A1 | 2/2002 | Iwatani | |
| 2002/0103923 A1 | 8/2002 | Cherian et al. | |
| 2003/0204726 A1 | 10/2003 | Kefford et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0061589 A1 | 3/2007 | Ulmer et al. | |
| 2007/0088952 A1 | 4/2007 | Hewitt et al. | |
| 2007/0174849 A1 | 7/2007 | Cheung et al. | |
| 2007/0180504 A1 | 8/2007 | Hung | |
| 2007/0186105 A1 | 8/2007 | Bailey et al. | |
| 2008/0009345 A1 | 1/2008 | Bailey et al. | |
| 2008/0043973 A1 | 2/2008 | Lai et al. | |
| 2008/0065905 A1* | 3/2008 | Salessi | G06F 21/72 713/193 |
| 2008/0148057 A1 | 6/2008 | Hauw | |
| 2008/0201458 A1 | 8/2008 | Salil | |
| 2008/0301332 A1 | 12/2008 | Butler et al. | |
| 2009/0259749 A1 | 10/2009 | Barrett et al. | |
| 2009/0282247 A1 | 11/2009 | Kirkup et al. | |
| 2009/0289916 A1 | 11/2009 | Dai | |
| 2010/0031200 A1 | 2/2010 | Chen | |
| 2010/0150348 A1 | 6/2010 | Fairbanks et al. | |
| 2010/0242104 A1 | 9/2010 | Wankmueller et al. | |
| 2010/0313063 A1 | 12/2010 | Venkataraja et al. | |
| 2011/0060913 A1 | 3/2011 | Hird et al. | |
| 2011/0119746 A1 | 5/2011 | Yang | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2012/0265994 A1* | 10/2012 | Jibbe | G06F 21/44 713/179 |
| 2013/0014248 A1 | 1/2013 | McLaughlin et al. | |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0118196 A1 | 4/2017 | Ponsini et al. | |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0021653 A1 | 1/2020 | Rao et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0228338 A1 | 7/2020 | Bowness | |
| 2020/0241890 A1 | 7/2020 | Mallick et al. | |
| 2020/0314218 A1 | 10/2020 | Kumar et al. | |
| 2020/0348860 A1 | 11/2020 | Mallick et al. | |
| 2020/0348861 A1 | 11/2020 | Marappan et al. | |
| 2020/0348869 A1 | 11/2020 | Gokam | |
| 2020/0349094 A1 | 11/2020 | Smith et al. | |
| 2020/0363985 A1 | 11/2020 | Gokam et al. | |
| 2020/0372401 A1 | 11/2020 | Mallick et al. | |
| 2021/0240608 A1* | 8/2021 | Jean | G06F 3/0623 |

FOREIGN PATENT DOCUMENTS

| | | | |
|---|---|---|---|
| EP | 2026494 A1 | 2/2009 | |
| EP | 2667569 A1 | 11/2013 | |
| GB | 2433147 A | 6/2007 | |
| WO | WO-0215018 A1 * | 2/2002 | G06F 21/80 |
| WO | 2011124275 A1 | 10/2011 | |
| WO | 2012001428 A1 | 1/2012 | |
| WO | PCT/US2019/052549 | 12/2019 | |

(56) References Cited

FOREIGN PATENT DOCUMENTS

WO PCT/US2019/053204 12/2019
WO PCT/US2019/053473 12/2019
WO PCT/US2019/067144 5/2020

OTHER PUBLICATIONS

NVM Express, "NVM Express, Revision 1.3," NVM Express, May 1, 2017, 282 pages.
VMWARE, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.
RSA, "RSA SecurID 800 Authenticator—Hybrid Authenticator that Provides a Seamless User Experience Across Multiple Applications Using Multiple Credentials," https://www.emc.com/collateral/data-sheet/9651-sid800-ds.pdf, Data Sheet, 2005-2009, 2 pages.
J-C. Liou et al., "On Improving Feasibility and Security Measures of Online Authentication," International Journal of Advanced Computer Science and Technology (IJACST), 2010, vol. 2, No. 4, pp. 6-16.
A.J. Menezes et al., "Handbook of Applied Cryptography," CRC Press, Oct. 1996, 794 pages.
U.S. Appl. No. 16/697,393 filed in the name of Vinay G. Rao et al., filed Nov. 27, 2019, and entitled "Automated Seamless Migration of Logical Storage Devices."
U.S. Appl. No. 16/710,828 filed in the name of Amit Pundalik Anchi et al., filed Dec. 11, 2019, and entitled "Automated Seamless Migration with Signature Issue Resolution."
U.S. Appl. No. 17/068,203 filed in the name of Sanjib Mallick et al., filed Oct. 12, 2020, and entitled "Host-Based Bandwidth Control for Virtual Initiators."

\* cited by examiner

SECURE TOKEN-BASED COMMUNICATIONS BETWEEN A HOST DEVICE AND A STORAGE SYSTEM

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols.

SUMMARY

Illustrative embodiments provide techniques for secure token-based communications between one or more host devices and a storage array or other type of storage system. Such techniques are illustratively provided at least in part utilizing multi-pathing software associated with a multi-path layer of the one or more host devices. For example, at least portions of the disclosed functionality can be managed in some embodiments by a host driver, such as a multi-path input-output (MPIO) driver, in conjunction with processing of IO operations. The MPIO driver is illustratively part of a multi-path layer that is configured to process IO operations of at least one host device that communicates with one or more storage arrays or other types of storage systems. Other types of host drivers or other host device components can be used in place of or in addition to one or more MPIO drivers.

In one embodiment, an apparatus comprises at least one processing device that includes a processor and a memory, with the processor being coupled to the memory. The at least one processing device is configured to control delivery of IO operations from a host device to a storage system over selected ones of a plurality of paths through a network, to generate a plurality of authentication tokens over time utilizing seed information of the host device, and for each of one or more of the IO operations, to incorporate a particular one of the authentication tokens into the IO operation, to send the IO operation to the storage system, and to receive an indication from the storage system, responsive to the IO operation sent to the storage system, as to whether or not the authentication token incorporated into the IO operation matches a corresponding authentication token generated by the storage system.

The storage system illustratively executes the IO operation responsive to a successful match, and does not execute the IO operation if there is no match, although other arrangements are possible.

The at least one processing device illustratively comprises at least a portion of the host device. Other embodiments can include multiple host devices, with each such host device implementing similar functionality.

In some embodiments, the paths are associated with respective initiator-target pairs, with the initiators of the initiator-target pairs illustratively comprising respective host bus adaptors (HBAs) of the host device and the targets of the initiator-target pairs illustratively comprising respective storage array ports of the storage system. Other types of paths involving other types of initiators and targets can be used in other embodiments.

In some embodiments, the at least one processing device comprises at least one MPIO driver implemented in the host device and configured to control delivery of IO operations to storage devices of the storage system over selected ones of the plurality of paths through the network.

In some embodiments, generating a plurality of authentication tokens over time utilizing seed information of the host device illustratively comprises generating a series of time-based passcodes utilizing the seed information and time information of the host device.

As another example, generating a plurality of authentication tokens over time utilizing seed information of the host device illustratively comprises generating a series of event-based passcodes utilizing the seed information and event counter information of the host device.

Other types of authentication tokens can be generated in other embodiments, utilizing other token generation techniques. The term "token" as used herein is therefore intended to be broadly construed.

Additionally or alternatively, generating a plurality of authentication tokens over time utilizing seed information of the host device comprises generating a first plurality of authentication tokens over time for a first application executing on the host device, utilizing first seed information of the host device, and generating a second plurality of authentication tokens over time for a second application executing on the host device, utilizing second seed information of the host device. Accordingly, some embodiments generate different sets of authentication tokens for different applications executing on the host device.

In some embodiments, incorporating a particular one of the authentication tokens into the IO operation comprises identifying a particular one of a plurality of applications, executing on the host device, that generated the IO operation, determining a current authentication token for the particular application, and incorporating the current authentication token for the particular application into the IO operation.

The seed information of the host device in some embodiments is stored in one or more data structures of the storage system and utilized by the storage system in generating the corresponding authentication token for comparison with the authentication token incorporated into the IO operation sent to the storage system.

In some embodiments, generating a plurality of authentication tokens over time utilizing seed information of the host device further comprises, for each of a plurality of time periods, determining current time information in the host device, combining the current time information with the seed information, and hashing a result of the combining to generate a current one of the authentication tokens as the particular one of the authentication tokens to be incorporated into the IO operation. Again, a wide variety of other types of token generation techniques can be used in other embodiments.

In some embodiments, incorporating a particular one of the authentication tokens into the IO operation comprises generating at least one of a read command and a write command that includes at least a portion of the authentication token. The read and write commands can comprise, for example, respective "vendor unique" or VU commands, with one or more portions thereof utilized to carry the particular authentication token. In other embodiments, one or more commands of a standard storage access protocol such as a SCSI or NVMe access protocol can be adapted to convey the authentication token to the storage system.

In some embodiments, receiving an indication from the storage system as to whether or not the authentication token incorporated into the IO operation matches a corresponding authentication token generated by the storage system comprises receiving a notification from the storage system that the IO operation has been executed by the storage system, with that notification being indicative of a match between the authentication tokens.

Additionally or alternatively, receiving an indication from the storage system as to whether or not the authentication token incorporated into the IO operation matches a corresponding authentication token generated by the storage system comprises receiving a notification from the storage system that the IO operation has not been executed by the storage system, with that notification being indicative of an absence of a match between the authentication tokens.

In some embodiments, the authentication token incorporated into the IO operation is determined to match the corresponding authentication token generated by the storage system responsive to an exact match between the authentication tokens.

However, it is to be appreciated that an exact match between the authentication tokens is not required in other embodiments. For example, the authentication token incorporated into the IO operation in some embodiments is determined to match the corresponding authentication token generated by the storage system responsive to an approximate match between the authentication tokens within a specified time window.

In some embodiments, the at least one processing device is further configured, responsive to receipt of an indication from the storage system that the authentication token incorporated into the IO operation does not match the corresponding authentication token generated by the storage system, to send at least one synchronization command to the storage system, with the at least one synchronization command comprising information that is utilized to synchronize time clocks between the host device and the storage system.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
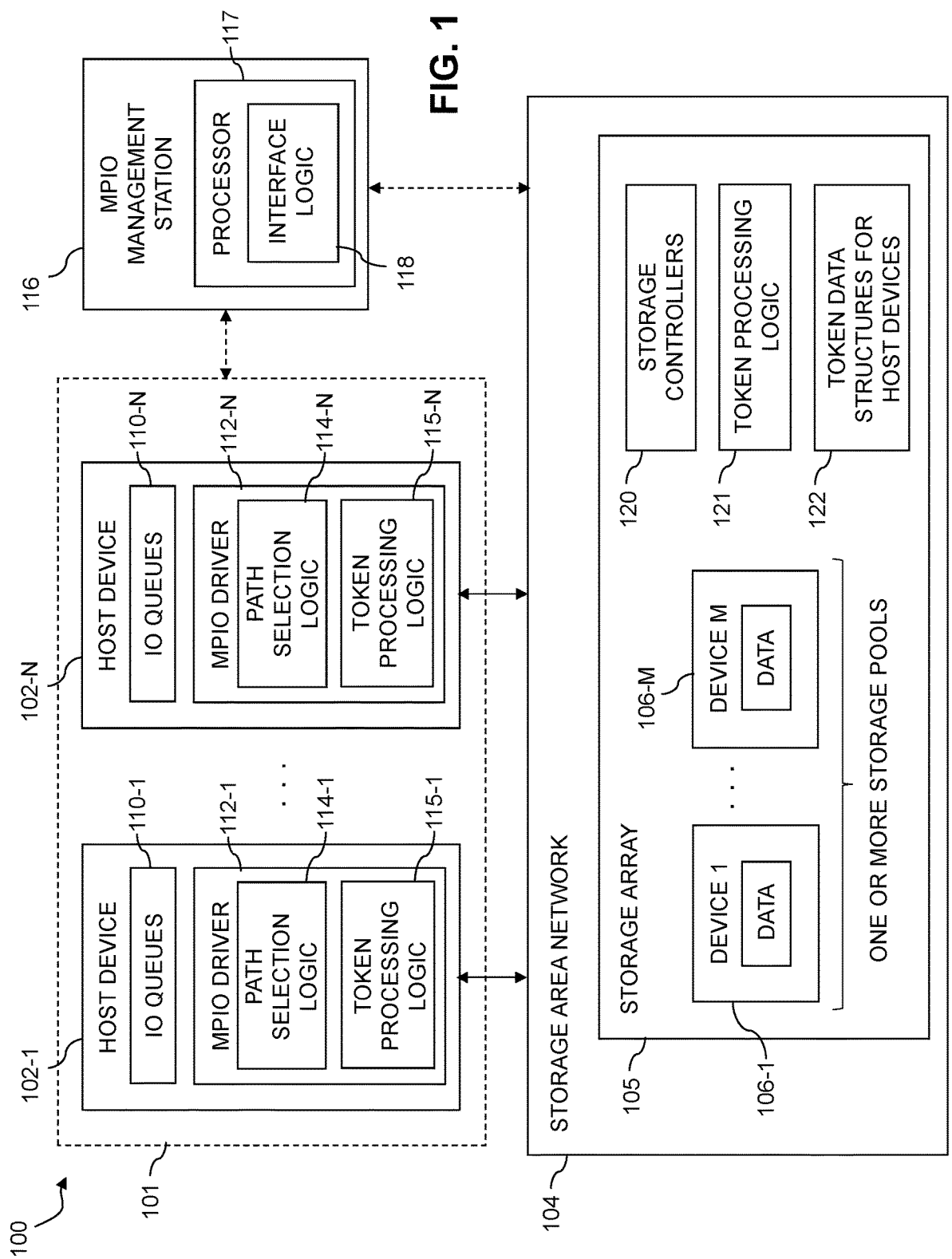
FIG. 1 is a block diagram of an information processing system configured with functionality for secure token-based communications in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 over the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for secure token-based communication as disclosed herein. Such functionality is provided at least in part using respective instances of token processing logic 115-1, . . . 115-N implemented within the MPIO drivers 112.

The MPIO drivers 112 may comprise, for example, otherwise conventional MPIO drivers, such as PowerPath® drivers from Dell Technologies, suitably modified in the manner disclosed herein to provide functionality for secure token-based communications. Other types of MPIO drivers from other driver vendors may be suitably modified to incorporate functionality for token-based communication as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server" relative to the storage array 105. Additional or alternative external servers of different types can be used in other embodiments. In some embodiments, one or more external servers, such as the MPIO management station 116, perform at least a portion of the token-based communication functionality disclosed herein, illustratively in cooperation with the storage array 105 and the instances of token processing logic 115 of the respective MPIO drivers 112.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the network 104 in order to determine the negotiated rate. The term "negotiated rate" therefore illustratively comprises a rate negotiated between an initiator or a target and a switch of a switch fabric of network 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

For example, some embodiments are configured to utilize link negotiation protocols that allow negotiation of data rates such as 1G, 2G, 4G, 8G, 16G, 32G, etc., where G denotes Gigabits per second (Gb/sec). The link bandwidth is illustratively specified in terms of Megabytes per second (MB/sec), and the actual amount of data that can be sent over the link in practice is typically somewhat lower than the negotiated data rate. Accordingly, a negotiated rate of 1G in some systems may correspond to an actual achievable data rate that is lower than 100 MB/sec, such as a rate of 85 MB/sec.

The term "negotiated rate" as used herein is therefore intended to be broadly construed, so as to encompass, for example, a theoretical negotiated rate or an actual achievable data rate that corresponds to the theoretical negotiated rate within a given system.

It is also to be appreciated that a wide variety of other types of rate negotiation may be performed in other embodiments.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others. The MPIO management station 116 in some embodiments is similarly configured to communicate directly with the storage array 105 using one or more such storage access protocols.

The MPIO driver 112-1 on the host device 102-1 illustratively has connectivity to the MPIO management station 116. The MPIO management station 116 in some embodiments implements PowerPath® Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to facilitate secure token-based communications as disclosed herein. For example, multi-pathing software residing on one or more of the host devices 102 (e.g., a server such as an ESXi server or an AIX server) is utilized in illustrative embodiments to support secure token-based communications.

In the FIG. 1 embodiment, the storage array 105 comprises a plurality of storage controllers 120, token processing logic 121, and corresponding token data structures 122 for respective ones of the host devices 102. In other embodiments, one or more of the token processing logic 121 and the corresponding token data structures 122 can be implemented at least in part external to the storage array 105 rather than internal to the storage array 105. For example, in some embodiments at least portions of the token processing logic 121 and corresponding token data structures 122 are implemented on one or more servers that are external to the storage array 105, such as in the MPIO management station 116 or in another type of external server.

Accordingly, such logic components and related stored information may be located internal to the storage array 105, external to the storage array 105, or implemented in part internally and in part externally to the storage array 105, and can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), "vendor unique" or VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

As indicated above, illustrative embodiments overcome various drawbacks of conventional practice by configuring the system 100 to include functionality for secure token-based communications, as will now be described in more detail.

In operation, the MPIO driver 112-1 is configured to control delivery of IO operations from its corresponding host device 102-1 to storage array 105 over selected ones of a plurality of paths through SAN 104, wherein the paths are associated with respective initiator-target pairs, the initiators being implemented on the host device 102-1 and the targets being implemented on the storage array 105. The MPIO driver 112-1 in the present embodiment is further configured to obtain authentication tokens of the host device 102-1, where such authentication tokens are generated over time utilizing seed information of the host device 102-1, and for each of one or more of the IO operations, to incorporate a particular one of the authentication tokens into the IO operation, to send the IO operation to the storage array 105, and to receive an indication from the storage array 105, responsive to the IO operation sent to the storage array 105, as to whether or not the authentication token incorporated into the IO operation matches a corresponding authentication token generated by the storage array 105.

The storage array 105 illustratively executes the IO operation responsive to a successful match, and does not execute the IO operation if there is no match, although other arrangements are possible.

It should be noted that authentication tokens in some embodiments need not be incorporated into each IO operation, but are instead incorporated into each of a designated subset of IO operations generated on the host device 102-1, such as, for example, particular IO operations of a certain type, or generated by a certain type of application, or having other specified characteristics.

The host device 102-1 is an example of what is more generally referred to herein as "at least one processing device" comprising a processor and a memory, with the processor being coupled to the memory.

The paths over which IO operations are delivered from the host device 102-1 to the storage array 105 under the control of the MPIO driver 112-1 are assumed to be associated with respective initiator-target pairs, with the initiators of the initiator-target pairs illustratively comprising respective HBAs of the host device 102-1 and the targets of the initiator-target pairs illustratively comprising respective storage array ports of the storage array 105. Other types of paths involving other types of initiators and targets can be used in other embodiments.

In some embodiments, generating a plurality of authentication tokens over time utilizing seed information of the host device 102-1 illustratively comprises generating a series of time-based passcodes utilizing the seed information and time information of the host device 102-1. One or more illustrative embodiments of this type can incorporate functionality of a time-synchronous authentication token generator such as the RSA SecurID® which is configured to generate time-synchronous tokencodes in the form of respective sets of digits, such as sets of 6 or 8 digits. Each of the tokencodes in a given series of time-synchronous tokencodes is valid only for a particular period of time, such as a minute. Accordingly, the tokencode output of the authentication token generator in this case is updated approximately once every minute. These update time periods are also referred to as "epochs."

Numerous other passcode arrangements are possible, and the term "passcode" as used herein is intended to be broadly construed. A passcode should be understood to encompass any arrangement of words, phrases, numbers or other combinations of characters suitable for user authentication.

In embodiments using these and other time-synchronous authentication tokens, the passcodes generated by a given one of the host devices 102 are illustratively based on a secret value and a current time value. The storage array 105 with access to the secret value and a current time value can determine that a given presented passcode is valid.

Event-based authentication tokens can additionally or alternatively be used. For example, generating a plurality of authentication tokens over time utilizing seed information of the host device 102-1 illustratively comprises generating a series of event-based passcodes utilizing the seed information and event counter information of the host device 102-1. In such arrangements, authentication tokens are generated responsive to respective occurrences of a designated event within the host, with each such occurrence causing a corresponding event counter to be incremented. A given authentication token is illustratively generated in such an embodiment using the seed information and a current value of the event counter.

Other types of authentication tokens can be generated in other embodiments, utilizing other token generation techniques. The term "token" as used herein is therefore intended to be broadly construed, so as to encompass tokens generated using time-based techniques, event-based techniques, and/or other techniques, as well as hybrid arrangements involving multiple such techniques.

Additionally or alternatively, generating a plurality of authentication tokens over time utilizing seed information of the host device 102-1 comprises generating a first plurality of authentication tokens over time for a first application executing on the host device 102-1, utilizing first seed information of the host device 102-1, and generating a second plurality of authentication tokens over time for a second application executing on the host device 102-1, utilizing second seed information of the host device 102-1. Accordingly, some embodiments generate different sets of authentication tokens for different applications executing on the host device 102-1.

In some embodiments, incorporating a particular one of the authentication tokens into the IO operation comprises identifying, from among a plurality of applications executing on the host device 102-1, a particular application that generated the IO operation, determining a current authentication token for the particular application, and incorporating the current authentication token for the particular application into the IO operation.

Accordingly, in some embodiments, authentication tokens are generated at the host device level, and serve to authenticate the host device to the storage array 105. Authentication tokens may additionally or alternatively be generated at the application level on a given host device, with different sets of authentication tokens being generated for different ones of the applications executing on the given host device, such that each of the applications is individually authenticated by the storage array 105. For example, application level authentication may be particularly useful in the case of certain types of host devices, such as ESXi servers in which vMotion functionality can be used to move applications between host devices.

The seed information of the host device 102-1 in some embodiments is stored in one or more data structures of the storage array 105 and utilized by the storage array 105 in generating the corresponding authentication token for comparison with the authentication token incorporated into the IO operation sent to the storage array 105. An example of such a token data structure will be described below in conjunction with FIG. 4.

In some embodiments, generating a plurality of authentication tokens over time utilizing seed information of the host device 102-1 further comprises, for each of a plurality of time periods, determining current time information in the host device 102-1, combining the current time information with the seed information, and hashing a result of the combining to generate a current one of the authentication tokens as the particular one of the authentication tokens to be incorporated into the IO operation. Again, a wide variety of other types of token generation techniques can be used in other embodiments.

In some embodiments, incorporating a particular one of the authentication tokens into the IO operation comprises generating at least one of a read command and a write command that includes at least a portion of the authentication token. The read and write commands can comprise, for example, respective "vendor unique" or VU commands, with one or more portions thereof utilized to carry the particular authentication token. In other embodiments, one or more commands of a standard storage access protocol such as a SCSI or NVMe access protocol can be adapted to convey the authentication token to the storage array 105.

In some embodiments, receiving an indication from the storage array 105 as to whether or not the authentication token incorporated into the IO operation matches a corresponding authentication token generated by the storage array 105 comprises receiving a notification from the storage array 105 that the IO operation has been executed by the storage array 105, wherein said notification is indicative of a match between the authentication tokens.

Additionally or alternatively, receiving an indication from the storage array 105 as to whether or not the authentication token incorporated into the IO operation matches a corresponding authentication token generated by the storage array 105 comprises receiving a notification from the storage array 105 that the IO operation has not been executed by the storage array 105, wherein said notification is indicative of an absence of a match between the authentication tokens.

In some embodiments, the authentication token incorporated into the IO operation is determined to match the corresponding authentication token generated by the storage array 105 responsive to an exact match between the authentication tokens.

However, it is to be appreciated that an exact match between the authentication tokens is not required in other embodiments. For example, the authentication token incorporated into the IO operation in some embodiments is determined to match the corresponding authentication token generated by the storage array 105 responsive to an approximate match between the authentication tokens within a specified time window.

Accordingly, the term "match" as used herein is intended to be broadly construed, so as to encompass, for example, an exact match, an approximate match, a sufficient match, or other type of indication that a host-side authentication token and a storage-side authentication token bear at least a threshold level of similarity to one another.

In some embodiments, the at least one processing device is further configured, responsive to receipt of an indication from the storage array 105 that the authentication token incorporated into the IO operation does not match the corresponding authentication token generated by the storage array 105, to send at least one synchronization command to the storage array 105, said at least one synchronization command comprising information utilized to synchronize time clocks between the host device 102-1 and the storage array 105.

Such synchronization commands are not limited to use responsive to the absence of a match between a host-side authentication token and a storage-side authentication token. For example, in some embodiments, synchronization commands are sent on a regular or periodic basis from each of the host devices 102 to the storage array 105, and provide current clock information for the respective host devices 102 such that the host-side and storage-side time clocks are kept in approximate synchronization.

These and other synchronization commands referred to herein are illustratively utilized as part of a clock synchronization process carried out between each of the host devices 102 and the storage array 105.

Although described in the context of some embodiments as being performed by the MPIO driver 112-1 utilizing its path selection logic 114-1 and token processing logic 115-1, one or more of the above-described operations in other embodiments can be performed elsewhere within the host device 102-1. Also, other ones of the MPIO drivers 112 and their respective other host devices 102 can be similarly configured.

An example of a process including token-based communication operations of the type outlined above will be described below in conjunction with the flow diagram of FIG. 2. These and other operations referred to herein as being performed by one or more host devices operating in conjunction with one or more storage arrays of a storage system can in other embodiments involve additional or alternative system components, possibly including one or more external servers such as MPIO management station 116.

As indicated previously, the initiators of the initiator-target pairs illustratively comprise respective HBAs of the host device 102-1 and the targets of the initiator-target pairs comprise respective storage array ports of the storage array 105.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the SAN 104 and the storage array 105. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is a system involving virtual machines (VMs), where multiple VMs run on a single ESXi server with HBAs. All VMs are using all HBAs but there is a need to be able to distinguish which IO belongs to which VM, for example, in order to implement service level objectives (SLOs) between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, the multiple virtual initiators are associated with a single HBA of the host device 102-1 but have respective unique identifiers associated therewith.

Additionally or alternatively, different ones of the multiple virtual initiators are illustratively associated with respective different ones of a plurality of virtual machines of the host device that share a single HBA of the host device, or a plurality of logical partitions of the host device that share a single HBA of the host device.

Again, numeral alternative virtual initiator arrangements are possible, as will be apparent to those skilled in the art.

The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

These and other aspects of secure token-based communications are illustratively performed by each of the instances of token processing logic 115 in respective ones of the MPIO drivers 112 of the multi-path layer. However, it is to be appreciated that additional or alternative components such as MPIO management station 116 can participate in one or more operations relating to token-based communication in other embodiments. The term "token-based communication" as used herein is intended to be broadly construed, so as to encompass a wide variety of additional or alternative arrangements for enhancing security of communications between one or more host devices and at least one storage array or other storage system using passcodes, such as those generated by a time-based or event-based passcode generator, or other types of authentication tokens.

These and other illustrative embodiments disclosed herein provide functionality for secure token-based communications, with at least portions of that functionality being implemented using one or more MPIO drivers of a multi-path layer of at least one host device. The MPIO drivers can comprise PowerPath® drivers suitably modified to implement the techniques disclosed herein. Other types of host multi-pathing software from other vendors can be similarly modified to implement the techniques disclosed herein. Again, MPIO drivers are not required, and other types of host drivers or more generally other host device components can be used.

As described above, in illustrative embodiments disclosed herein, the host devices 102 are configured to interact with storage array 105 to provide secure token-based communications between host devices 102 and storage array 105. For example, host-side authentication tokens generated by one of the host devices 102 are incorporated into IO operations sent from that host device to the storage array 105, and compared to storage-side authentication tokens generated by the storage array 105, in order to determine whether or not the host device is authenticated, before executing the received IO operations. A match between the host-side authentication token received in a given IO operation and the corresponding storage-side authentication token generated by the storage array 105 indicates that the sending host device is authenticated and therefore the given IO operation can be executed by the storage array 105. The absence of such a match indicates that the sending host device is not authenticated and therefore the given IO operation is not executed by the storage array 105.

An example of an algorithm performed by a given one of the host devices 102 utilizing its MPIO driver and its corresponding instances of path selection logic 114 and token processing logic 115 will now be described.

It is assumed in this embodiment that many host devices (e.g., 1000 or more host devices) are connected to a storage array and communicate with it using a storage access protocol such as iSCSI, SCSI-FC, NVMe/FC, etc. Although certain storage access protocols include a one-time security token initially used when the host logs into the storage array (e.g., CHAP in iSCSI) others have no such security features (e.g., SCSI-FC, NVMe/FC). This embodiment is therefore configured to provide enhanced security by embedding an authentication token in each IO command sent from each host to the storage array to allow the storage array to validate each IO command as having been sent from an authenticated host (or authentication application executing on the host).

The example algorithm in the present embodiment illustratively includes the following steps, although additional or alternative steps can be used:

1. Each host (or each of one or more applications executing on each host, depending on granularity needed) stores unique seed information that is used to generate its host-side authentication tokens.

2. The storage array maintains token data structures for respective ones of the hosts, with a given such token data structures for a given one of the hosts including seed information for the host, clock information for the host, and other information utilized to generate storage-side authentication tokens for the host. The seed information can be entered by an administrator or other user during on-boarding or pushed automatically from the host to the storage array following a root-level user command.

3. When on-boarding a new host to the storage array, the user will first connect the host to the storage array, and provision it in the storage array to allow connectivity (e.g., using zoning and masking). The user will also enter the seed information of the host (or application) to the storage array. Alternatively, the host MPIO driver will issue a new VU SCSI command (following a user command) which will contain the host ID (e.g., host name), host application name, serial number, host current time and any other information needed by the storage array to on-board the new host/application.

4. An authentication token will be generated every X seconds (e.g., every X=60 seconds) on both the host and the storage array. The token generated on the host is also referred to herein as a host-side authentication token, and the token generated on the storage array is also referred to herein as a storage-side authentication token.

For example, on the host, once every X seconds, the 64-bit current time will be appended to the 128-bit seed record, to algorithmically generate a large number which is hashed down to produce a 6-digit or 8-digit output as an authentication token. In some embodiments, the token generation algorithm is illustratively based on the AES-128 symmetric cryptography standard, and it is generally considered impossible to reverse engineer the 128-bit seed record from the authentication token output. Other types of token generation algorithms can be used in other embodiments.

Similarly, on the storage array, once every X seconds, an authentication token is generated for each host. More particularly, the storage array will utilize its database of host names (e.g., host registration database), the unique seed and other related information associated with each host (e.g., entered during on-boarding of the host), and the same token generation algorithm utilized by the hosts in generating their host-side authentication tokens, to generate storage-side authentication tokens for the respective hosts.

5. The MPIO driver on the host will embed a host-side authentication token in each IO command sent by that host, illustratively by using a vendor unique read and/or write command with space reserved for the token (e.g., an existing vendor unique read command with additional bytes for the token) or by using existing standardized protocols. In other embodiments, the tokens are embedded in only a designated subset of the IO commands. These IO commands are an example of what are more generally referred to herein as IO operations, and can include, for example, read and/or write requests.

6. The storage array authenticates each IO command received from a known host. More particularly, the storage array has calculated the token for each host and will compare it to the token received in the command.

7. If the tokens exactly match, the storage array will allow the IO command to be executed in the storage array.

8. If the tokens do not exactly match, since the token changes once per X second time interval, a designated amount of time flexibility (e.g., +/−n seconds) is permitted, as the time synchronization between the storage array and multiple hosts might not be accurate to a microsecond or millisecond level. If the token received for a given time interval is the token for the previous time interval and not more than n seconds have passed, the IO command will be permitted to execute. In some embodiments, n is on the order of 2-5 seconds, although other values could be used. This type of time flexibility may be viewed as an example of what is also referred to herein as an "approximate match" or a "sufficient match" between the host-side and storage-side tokens.

9. If after all checks are complete it is determined that the tokens do not sufficiently match, the IO command will be finally rejected with an appropriate check condition ("chk_cond") notification to the host. For example, if the n second window has passed, the storage array will start rejecting IO commands with the appropriate chk_cond notification to the host for each such IO command rejection, and the host will respond to such a chk_cond notification by sending a time synchronization ("time-sync") command to synchronize the storage array clock with the host clock. As indicated previously, the storage array maintains token data structures with seed information and current clock information for each host, and uses that information to create the storage-side authentication token for the corresponding host. Such functionality addresses the fact that the host clock might drift, and/or the host might be rebooted and time will pass before its network time will be fully synced, etc.

10. Even in the absence of rejected IO commands, the MPIO driver on each host will periodically issue a VU SCSI command to allow the host and the storage array to synchronize their clocks. Such a VU command illustratively includes all information needed in order to securely identify the host to the storage array (e.g., host name, current token, current host clock information, etc.), and is considered another example of what is more generally referred to herein as a "synchronization command."

This particular algorithm is presented by way of illustrative example only, and other embodiments can use other types of algorithms to provide secure token-based communications between one or more host devices and a storage array or other type of storage system.

Illustrative embodiments provide significant advantages over conventional practice. For example, unlike conventional techniques, some embodiments disclosed herein can provide secure token-based communications for a wide variety of different types of host devices and their corresponding storage systems, such as host devices comprising ESXi servers or AIX servers, and the illustrative embodiments can provide significantly improved security in these and other contexts.

Portions of the above-described algorithms and other related techniques and functionality are illustratively implemented by a given MPIO driver on a corresponding host device, and similarly by other MPIO drivers on respective other host devices. Such MPIO drivers illustratively form a multi-path layer or MPIO layer comprising multi-pathing software of the host devices. Other types of multi-pathing software and host drivers can be used in other embodiments. Additionally or alternatively, other host device components can be used to implement at least portions of the disclosed token-based communication functionality.

Although VU commands are used in illustrative embodiments herein, other types of commands can be used in other embodiments. For example, various types of log sense, mode sense and/or other "read-like" commands, possibly including one or more commands of a standard storage access protocol such as the above-noted SCSI and NVMe access protocols, can be used in other embodiments.

The steps of the above-described example algorithm are illustrative only, and should not be considered limiting in any way.

Additional examples of token-based communication arrangements will be described elsewhere herein in conjunction with the embodiments of FIGS. 2 through 4. Other types of token-based communication arrangements can be used in other embodiments.

These and other functions related to token-based communication that are referred to herein as being performed by or under the control of the MPIO drivers 112 through interaction with the storage array 105 can in some embodiments be performed at least in part outside of MPIO drivers 112 utilizing other system components.

The above-described functions associated with token-based communication in the MPIO driver 112-1 in some embodiments are carried out at least in part under the control of its token processing logic 115-1, illustratively operating in cooperation with path selection logic 114-1. For example, the token processing logic 115-1 is illustratively configured to control performance of portions of an algorithm comprising the steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver JO operations from its corresponding one of the sets of JO queues 110 to the storage array 105 over selected paths through the SAN 104, and to perform the disclosed functionality for token-based communication.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support token-based communication.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and token processing logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 210, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
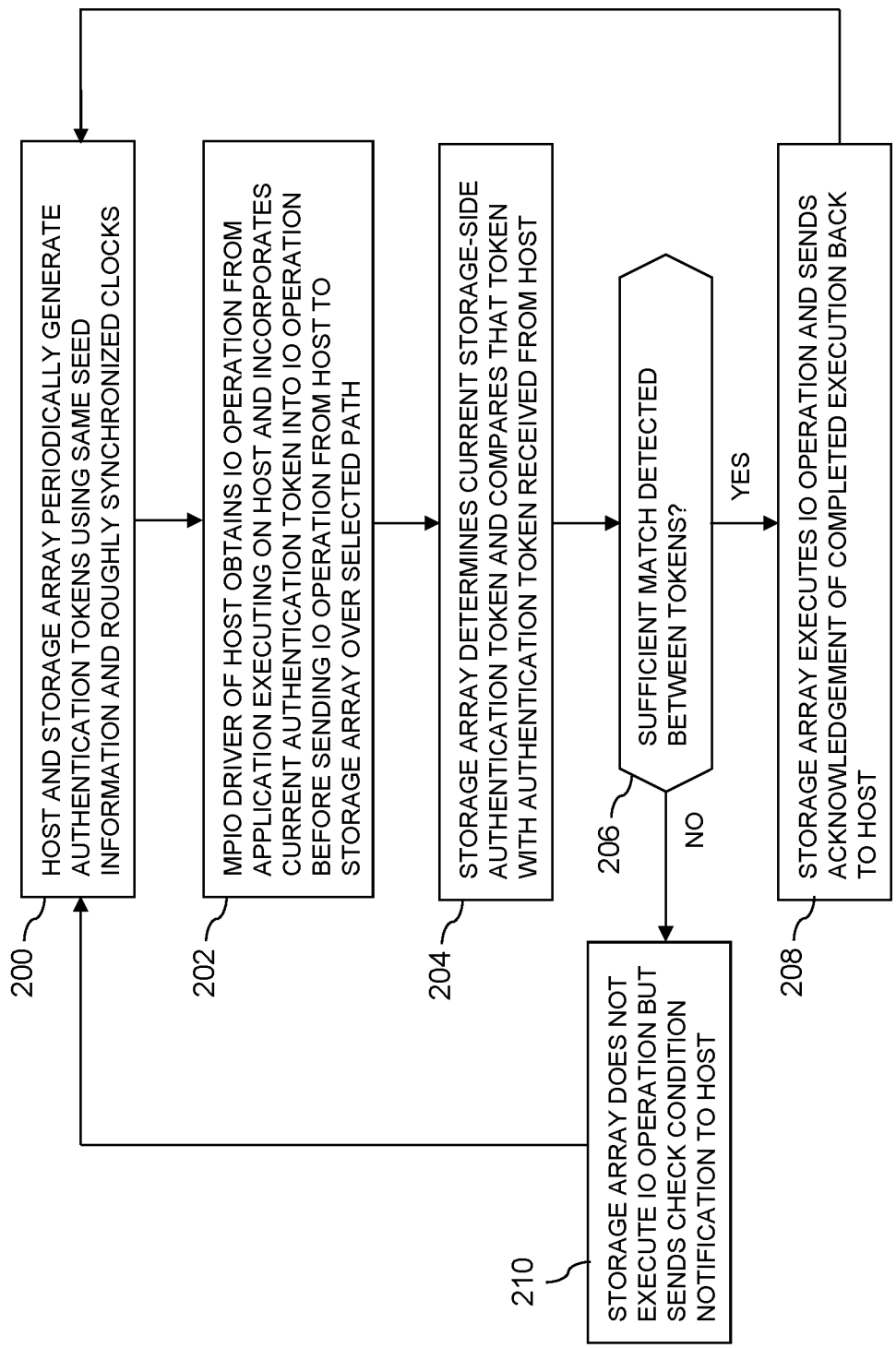
FIG. 2 is a flow diagram of a process for secure token-based communications in an illustrative embodiment.

The steps of the FIG. 2 process are illustratively performed at least in part by or under the control of a multi-path layer comprising one or more MPIO drivers of respective host devices, a storage array or other storage system, and possibly one or more additional components such as an external server comprising an MPIO management station. Other arrangements of additional or alternative system components can be configured to perform at least portions of one or more of the steps of the FIG. 2 process in other embodiments.

The steps shown in FIG. 2 more specifically relate to authentication of a particular host device, also referred to in the following description as simply a "host," by a storage array. Similar processes can be implemented for each of a plurality of additional hosts in order to authenticate those hosts to the storage array.

In step 200, the host and storage array periodically generate authentication tokens using the same seed information and roughly synchronized clocks. It is assumed in this embodiment that both the host and the storage array generate a plurality of authentication tokens over time utilizing seed information of the host device, illustratively by generating a series of time-based passcodes utilizing the seed information and time information of the host device. This is in contrast to some other embodiments disclosed herein that use event-based authentication tokens generated using event counters. A time-based passcode is an example of a type of "authentication token" as that term is broadly used herein.

The term "roughly synchronized clocks" is intended to indicate that the respective clocks of the host and the storage array need not be precisely synchronized, but only synchronized to the extent necessary to allow accurate comparison of time-based authentication tokens generated by the host and storage array. The degree of synchronization required illustratively depends upon implementation-specific factors used in generating the time-based authentication tokens, such as the duration of respective epochs or other specified time periods in which each of the host and the storage array generates a single authentication token.

In step 202, the MPIO driver of the host obtains an IO operation from an application executing on the host and incorporates a current authentication token into the IO operation before sending the IO operation from the host to the storage array over a selected path. It is assumed in the present embodiment that the MPIO driver of the host device controls the delivery of storage access protocol commands from the host device to the storage array over selected paths through the SAN.

In step 204, the storage array determines the current storage-side authentication token for the host and compares that authentication token with the authentication token received in the IO operation from the host.

In step 206, a determination is made by the storage array as to whether or not a sufficient match is detected between the two authentication tokens, one generated by the storage array and one received by the storage array in the IO operation from the host. If a sufficient match is detected between the two authentication tokens, the process moves to step 208, and otherwise moves to step 210 as indicated.

In step 208, which is reached responsive to detection of a sufficient match between the two authentication tokens, the storage array executes the IO operation and sends an acknowledgement of completed execution back to the host. The process then returns to step 200 to continue generating authentication tokens, and handles additional IO operations using one or more of those authentication tokens in respective additional passes through steps 202 through 208 or 210 of the process.

In step 210, which is reached responsive to the absence of detection of a sufficient match between the two authentication tokens, the storage array does not execute the IO operation and instead sends a check condition notification back to the host. The process then returns to step 200 to continue generating authentication tokens, and handles additional IO operations using one or more of those authentication tokens in respective additional passes through steps 202 through 208 or 210 of the process.

The host responsive to receipt of the check condition notification sent by the storage array in step 210 can also initiate a clock synchronization process with the storage array, as the authentication failure indicated by the absence of a sufficient match between the authentication tokens may have been due to the host and storage array clocks becoming unsynchronized. After the host and storage array clocks are resynchronized, the IO operation that failed authentication can be resent by the MPIO driver with a new authentication token. The clock synchronization process can be initiated by the host sending its clock information to the storage array using "vendor unique" or VU commands of a designated storage access protocol, such as a SCSI or NVMe access protocol.

Other types of commands can additionally or alternatively be used to directly or indirectly convey host clock information to the storage array for use in achieving a rough synchronization of their respective clocks for use in generating comparable authentication tokens. For example, it is possible in some embodiments that the storage array can obtain current clock information for one or more host devices via an intervening external server, such as the MPIO management station 116 of FIG. 1. Such an MPIO management station can be considered part of a multi-path layer that includes the MPIO driver. The term "multi-path layer" as used herein is therefore intended to be broadly construed.

The generation of authentication tokens in step 200 illustratively occurs at least in part in parallel with processing of IO operations through respective instances of steps 200 to 208 or 210 of the FIG. 2 process. Accordingly, multiple IO operations processed within a given epoch or other specified time period for generation of a particular authentication token by host and storage array can each have incorporated therein the current authentication token generated by the host for that time period.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for token-based communication. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different token-based communication arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
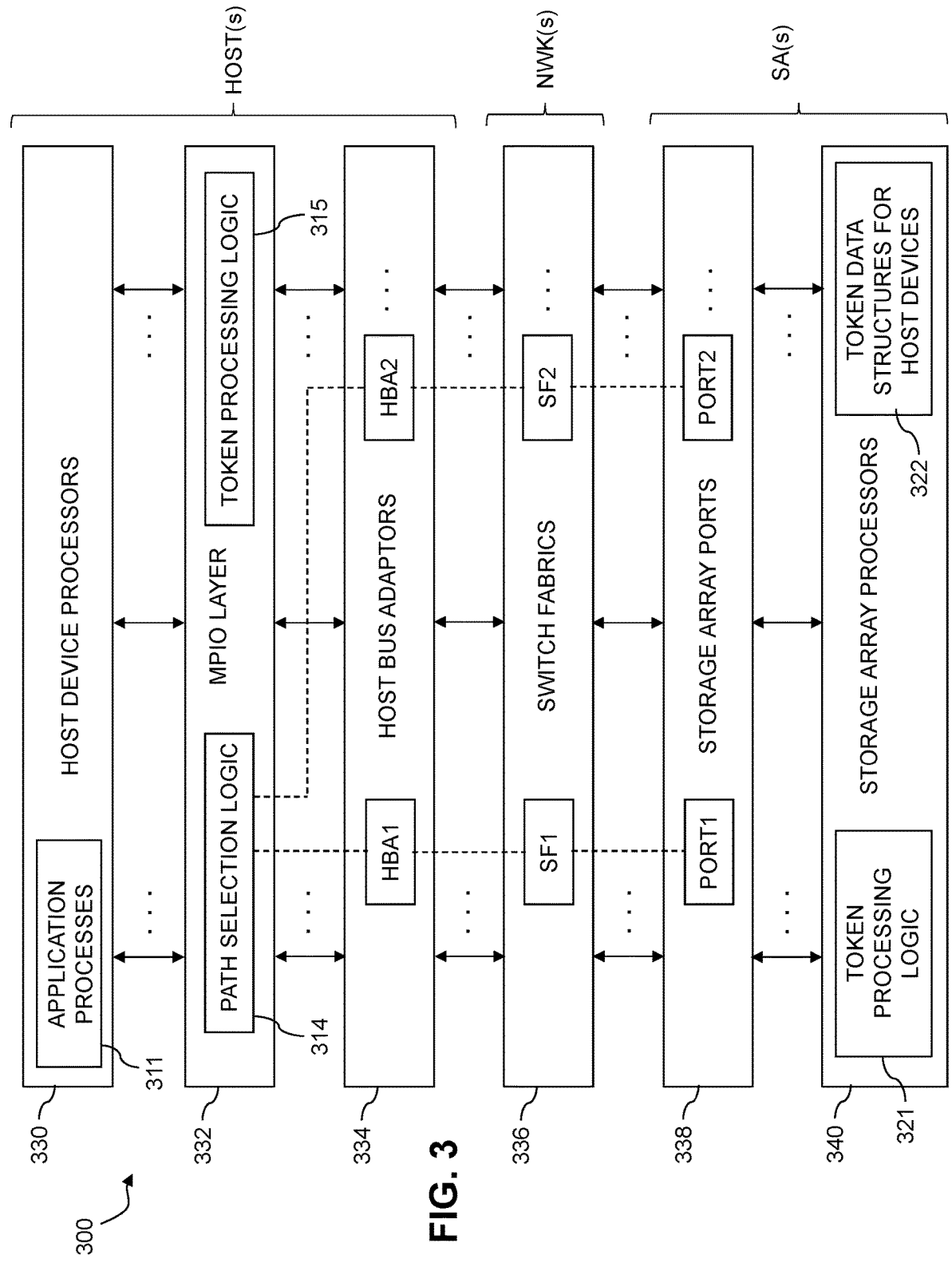
FIG. 3 is a block diagram showing multiple layers of a layered system architecture that incorporates functionality for secure token-based communications in an illustrative embodiment.

Referring now to FIG. 3, another illustrative embodiment is shown. In this embodiment, an information processing system 300 comprises host-side elements that include application processes 311, path selection logic 314 and token processing logic 315, and storage-side elements that include token processing logic 321 and corresponding token data structures 322 for respective host devices. The token data structures 322 in some embodiments include seed information for one or more host devices. There may be separate instances of one or more such elements associated with each of a plurality of system components such as host devices and storage arrays of the system 300.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs"). The storage array processors of the storage array processor layer 340 may be viewed as corresponding to one or more storage controllers such as the storage controllers 120 of the storage array 105.

The application processes 311 of the host device processor layer 330 generate IO operations that are processed by the MPIO layer 332 for delivery to the one or more storage arrays over the SAN comprising switch fabrics of switch fabric layer 332, using secure token-based communications as disclosed herein. Paths are determined by the path selection logic 314 for sending such IO operations to the one or more storage arrays. At least a subset of these IO operations each incorporate an authentication token generated by the host device as previously described. For example, in some embodiments, each IO operation incorporates an authentication token. In other embodiments, only selected subsets of the IO operations incorporate authentication tokens.

The MPIO layer 332 is an example of what is also referred to herein as a multi-path layer, and comprises one or more MPIO drivers implemented in respective host devices. Each such MPIO driver illustratively comprises respective instances of path selection logic 314 and token processing logic 315 configured as previously described. Additional or alternative layers and logic arrangements can be used in other embodiments.

In a manner similar to that described elsewhere herein, the MPIO layer 332 comprising token processing logic 315 illustratively incorporates a host-side authentication token in each of a plurality of IO operations generated by a given host device. The IO operations are sent by the MPIO layer 332 to a storage array over respective paths selected using one or more algorithms implemented by path selection logic 314. For a given such received IO operation, the storage array compares the host-side authentication token incorporated in that IO operation to a corresponding storage-side authentication token generated by the storage array, and if a sufficient match is detected between the host-side and storage-side authentication tokens, the storage array executes the IO operation and provides an acknowledgement of completed execution of the IO operation back to the host device. If a sufficient match is not detected between the host-side and storage-side authentication tokens, the storage array does not execute the IO operation, and instead provides a check condition notification back to the host device. Such storage-side verification operations are illustratively performed using token processing logic 321 and associated token data structures 322. Responsive to receipt of such a check condition notification, the host device illustratively initiates a clock synchronization process with the storage array.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of k paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays. At least a subset of the IO operations have authentication tokens incorporated therein under the control of the token processing logic 315. These authentication tokens are illustratively verified or rejected by the token processing logic 321 using information stored in one or more of the token data structures 322.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of IO host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Figure 4:
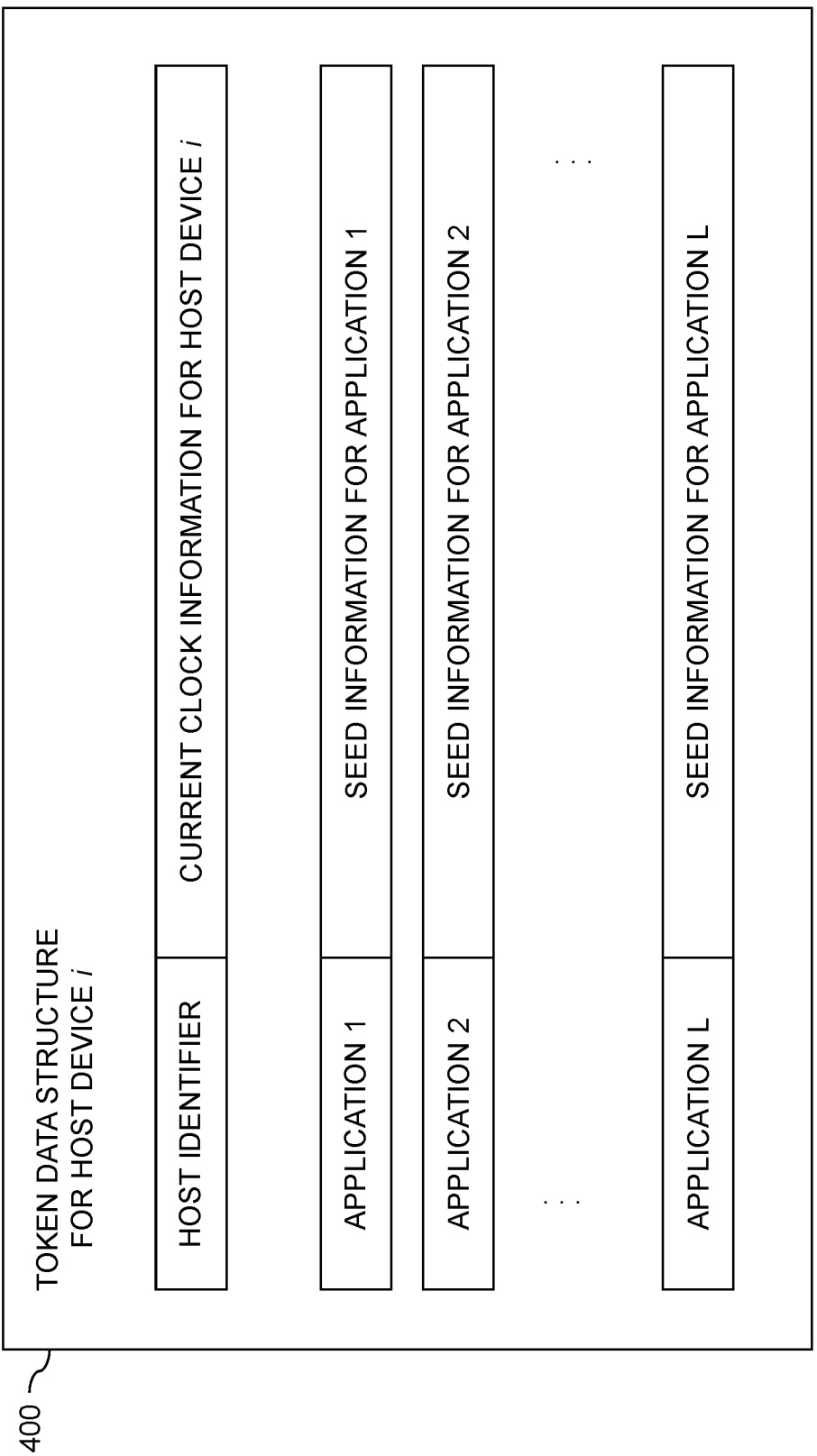
FIG. 4 shows an example data structure utilized in implementing secure token-based communications in an illustrative embodiment.

Referring now to FIG. 4, an example data structure 400 utilized in providing secure token-based communications as disclosed herein is shown.

In the example data structure 400, which may be viewed as one of the token data structures 122 of the FIG. 1 embodiment or one of the token data structures 322 of the FIG. 3 embodiment, a storage array stores seed information, clock information and other types of information for a particular host device i, where i=1, 2, ... N in a set of N host devices such as that shown in the FIG. 1 embodiment.

The stored information of the token data structure 400 more particularly comprises an identifier of the host device, as well as current clock information for the host device. The current clock information for the host device is illustratively obtained by the storage array directly from the host device itself as part of a clock synchronization process carried out between the storage array and the host device. Alternatively, such information can be obtained by the storage array via a central server such as the MPIO management station 116.

Additionally, the token data structure 400 include separate seed information for each of a plurality of applications executing on host device i. The applications are denoted as Application 1, Application 2, . . . Application L, and the storage array stores separate seed information for each of the applications.

This is an example of an embodiment in which different authentication token seed information is used to generate authentication tokens for different applications executing on the host device. The IO operations generated by a given one of the applications are processed by token processing logic of an MPIO driver of the host device to incorporate authentication tokens generated using the particular seed information for that application.

In other embodiments, all of the applications share the same seed information, and IO operations generated by different applications each include authentication tokens generated using that same seed information.

The particular token data structure arrangement shown in FIG. 4 is only an example, and numerous other types and arrangements of token data structures can be utilized in other embodiments.

The above-described processes, algorithms and other features and functionality disclosed herein are presented by way of illustrative example only, and other embodiments can utilize additional or alternative arrangements.

Also, as mentioned previously, different instances of the above-described processes, algorithms and other token-based communication techniques can be performed using different system components. For example, various aspects of token-based communication functionality in some embodiments can be implemented at least in part using one or more servers that are external to a storage array 105 or other type of storage system. Also, token processing logic can be implemented using other types of host drivers, such as, for example, iSCSI drivers, or more generally other host device components.

The particular token-based communication arrangements described above are therefore presented by way of illustrative example only. Numerous alternative arrangements of these and other features can be used in implementing the token-based communication in other illustrative embodiments.

The illustrative embodiments disclosed herein can provide a number of significant advantages relative to conventional arrangements.

For example, some embodiments are advantageously configured to provide substantially improved security in communications exchanged between a host device and a storage system, illustratively by incorporating authentication tokens into IO operations sent from the host device to the storage system for execution.

These and other embodiments can provide efficient and inexpensive security in cases in which the storage access protocols utilized by the host device and storage system do not incorporate explicit security features, such as SCSI-FC, NVMe/FC and many others.

Illustrative embodiments can provide individual secure authentication of each of a plurality of different applications executing on a given host.

Various aspects of functionality associated with secure token-based communications as disclosed herein can be implemented in a storage system, in a host device, or partially in a storage system and partially in a host device, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and token processing logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, initiators, targets, token processing logic, token data structures, and additional or alternative components. Also, the particular configurations of system and device elements and associated processing operations illustratively shown in the drawings can be varied in other embodiments. For example, a wide variety of different host device and storage system configurations and associated token-based communication arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   wherein the at least one processing device is configured:
   to control delivery of input-output operations from a host device to a storage system over selected ones of a plurality of paths through a network;
   to generate a plurality of authentication tokens over time utilizing seed information of the host device; and
   for each of one or more of the input-output operations:
   to incorporate a particular one of the authentication tokens into the input-output operation;
   to send the input-output operation to the storage system; and
   to receive an indication from the storage system, responsive to the input-output operation sent to the storage system, as to whether or not the authentication token incorporated into the input-output operation matches a corresponding authentication token generated by the storage system;
   wherein the at least one processing device is further configured, responsive to receipt of an indication from the storage system that the authentication token incorporated into the input-output operation does not match the corresponding authentication token generated by the storage system, to send at least one synchronization command to the storage system; and wherein the at least one processing device implements a multi-path input-output driver of the host device, the multi-path input-output driver being configured to control the delivery of input-output operations from the host device to the storage system over selected ones of the plurality of paths through the network, the multi-path input-output driver being further configured to obtain a given one of the input-output operations and to incorporate the particular one of the authentication tokens into the given input-output operation.

2. The apparatus of claim 1 wherein the at least one processing device comprises at least a portion of the host device.

3. The apparatus of claim 1 wherein generating a plurality of authentication tokens over time utilizing seed information of the host device comprises generating a series of time-based passcodes utilizing the seed information and time information of the host device.

4. The apparatus of claim 1 wherein generating a plurality of authentication tokens over time utilizing seed information of the host device comprises generating a series of event-based passcodes utilizing the seed information and event counter information of the host device.

5. The apparatus of claim 1 wherein generating a plurality of authentication tokens over time utilizing seed information of the host device comprises:
generating a first plurality of authentication tokens over time for a first application executing on the host device, utilizing first seed information of the host device; and
generating a second plurality of authentication tokens over time for a second application executing on the host device, utilizing second seed information of the host device.

6. The apparatus of claim 1 wherein incorporating a particular one of the authentication tokens into the input-output operation comprises:
identifying a particular one of a plurality of applications, executing on the host device, that generated the input-output operation;
determining a current authentication token for the particular application; and
incorporating the current authentication token for the particular application into the input-output operation.

7. The apparatus of claim 1 wherein the seed information of the host device is stored in one or more data structures of the storage system and utilized by the storage system in generating the corresponding authentication token for comparison with the authentication token incorporated into the input-output operation sent to the storage system.

8. The apparatus of claim 1 wherein generating a plurality of authentication tokens over time utilizing seed information of the host device further comprises, for each of a plurality of time periods:
determining current time information in the host device;
combining the current time information with the seed information; and
hashing a result of the combining to generate a current one of the authentication tokens as the particular one of the authentication tokens to be incorporated into the input-output operation.

9. The apparatus of claim 1 wherein incorporating a particular one of the authentication tokens into the input-output operation comprises generating at least one of a read command and a write command that includes at least a portion of the authentication token.

10. The apparatus of claim 1 wherein receiving an indication from the storage system as to whether or not the authentication token incorporated into the input-output operation matches a corresponding authentication token generated by the storage system comprises receiving a notification from the storage system that the input-output operation has been executed by the storage system, wherein said notification is indicative of a match between the authentication tokens.

11. The apparatus of claim 1 wherein receiving an indication from the storage system as to whether or not the authentication token incorporated into the input-output operation matches a corresponding authentication token generated by the storage system comprises receiving a notification from the storage system that the input-output operation has not been executed by the storage system, wherein said notification is indicative of an absence of a match between the authentication tokens.

12. The apparatus of claim 1 wherein the authentication token incorporated into the input-output operation is determined to match the corresponding authentication token generated by the storage system responsive to an exact match between the authentication tokens.

13. The apparatus of claim 1 wherein the authentication token incorporated into the input-output operation is determined to match the corresponding authentication token generated by the storage system responsive to an approximate match between the authentication tokens within a specified time window.

14. The apparatus of claim 1 wherein the at least one synchronization command comprises information utilized to synchronize time clocks between the host device and the storage system.

15. A computer program product comprising a non-transitory processor-readable storage medium having stored therein program code of one or more software programs, wherein the program code, when executed by at least one processing device comprising a processor coupled to a memory, causes the at least one processing device:
to control delivery of input-output operations from a host device to a storage system over selected ones of a plurality of paths through a network;
to generate a plurality of authentication tokens over time utilizing seed information of the host device; and
for each of one or more of the input-output operations:
to incorporate a particular one of the authentication tokens into the input-output operation;
to send the input-output operation to the storage system; and
to receive an indication from the storage system, responsive to the input-output operation sent to the storage system, as to whether or not the authentication token incorporated into the input-output operation matches a corresponding authentication token generated by the storage system;
wherein the program code, when executed by the at least one processing device, further causes the at least one processing device, responsive to receipt of an indication from the storage system that the authentication token incorporated into the input-output operation does not match the corresponding authentication token generated by the storage system, to send at least one synchronization command to the storage system; and wherein the at least one processing device implements a multi-path input-output driver of the host device, the multi-path input-output driver being configured to control the delivery of input-output operations from the host device to the storage system over selected ones of the plurality of paths through the network, the multi-path input-output driver being further configured to obtain a given one of the input-output operations and to incorporate the particular one of the authentication tokens into the given input-output operation.

16. The computer program product of claim 15 wherein generating a plurality of authentication tokens over time utilizing seed information of the host device comprises:
generating a first plurality of authentication tokens over time for a first application executing on the host device, utilizing first seed information of the host device; and
generating a second plurality of authentication tokens over time for a second application executing on the host device, utilizing second seed information of the host device.

17. The computer program product of claim 15 wherein incorporating a particular one of the authentication tokens into the input-output operation comprises:
identifying a particular one of a plurality of applications, executing on the host device, that generated the input-output operation;
determining a current authentication token for the particular application; and
incorporating the current authentication token for the particular application into the input-output operation.

18. A method comprising:
controlling delivery of input-output operations from a host device to a storage system over selected ones of a plurality of paths through a network;
generating a plurality of authentication tokens over time utilizing seed information of the host device; and
for each of one or more of the input-output operations:
incorporating a particular one of the authentication tokens into the input-output operation;
sending the input-output operation to the storage system; and
receiving an indication from the storage system, responsive to the input-output operation sent to the storage system, as to whether or not the authentication token incorporated into the input-output operation matches a corresponding authentication token generated by the storage system;
the method further comprising:
responsive to receipt of an indication from the storage system that the authentication token incorporated into the input-output operation does not match the corresponding authentication token generated by the storage system, sending at least one synchronization command to the storage system;
wherein the method is performed by at least one processing device comprising a processor coupled to a memory; and
wherein the at least one processing device implements a multi-path input-output driver of the host device, the multi-path input-output driver being configured to control the delivery of input-output operations from the host device to the storage system over selected ones of the plurality of paths through the network, the multi-path input-output driver being further configured to obtain a given one of the input-output operations and to incorporate the particular one of the authentication tokens into the given input-output operation.

19. The method of claim 18 wherein generating a plurality of authentication tokens over time utilizing seed information of the host device comprises:
generating a first plurality of authentication tokens over time for a first application executing on the host device, utilizing first seed information of the host device; and
generating a second plurality of authentication tokens over time for a second application executing on the host device, utilizing second seed information of the host device.

20. The method of claim 18 wherein incorporating a particular one of the authentication tokens into the input-output operation comprises:
identifying a particular one of a plurality of applications, executing on the host device, that generated the input-output operation;
determining a current authentication token for the particular application; and
incorporating the current authentication token for the particular application into the input-output operation.

* * * * *